US012043439B2

(12) United States Patent
Poggi

(10) Patent No.: US 12,043,439 B2
(45) Date of Patent: Jul. 23, 2024

(54) MACHINE AND IMPROVED PACKAGING PROCESS OF A DISPOSABLE DISPENSER WITH INTEGRATED STRAW

(71) Applicant: POGGI PACK—S.R.L., Savignano Sul Rubicone (IT)

(72) Inventor: Gino Poggi, Rimini (IT)

( * ) Notice: Subject to any disclaimer, the term of this patent is extended or adjusted under 35 U.S.C. 154(b) by 0 days.

(21) Appl. No.: 18/306,491

(22) Filed: Apr. 25, 2023

(65) Prior Publication Data

US 2023/0339640 A1 Oct. 26, 2023

(30) Foreign Application Priority Data

Apr. 26, 2022 (IT) ........................ 102022000008192

(51) Int. Cl.

*B65B 61/18* (2006.01)
*B31B 70/84* (2017.01)
*B65B 43/14* (2006.01)
*B65B 43/46* (2006.01)
*B65B 43/60* (2006.01)
*B65B 51/14* (2006.01)
*B65B 61/20* (2006.01)

(52) U.S. Cl.

CPC .......... *B65B 61/186* (2013.01); *B31B 70/844* (2017.08); *B65B 43/14* (2013.01); *B65B 43/465* (2013.01); *B65B 43/60* (2013.01); *B65B 51/146* (2013.01); *B65B 61/205* (2013.01)

(58) Field of Classification Search

CPC ....... B65B 43/12; B65B 43/14; B65B 43/465; B65B 43/50; B65B 43/56; B65B 43/60; B65B 51/146; B65B 61/186; B65B 61/205; B29C 66/53262; B31B 70/844

USPC ..................................... 53/410, 133.1, 133.2

See application file for complete search history.

(56) References Cited

U.S. PATENT DOCUMENTS 4,614,074 A * 9/1986 Evers .................... B65B 61/205 53/410
5,937,617 A * 8/1999 Yeager ................. B65D 77/283 206/217
6,854,490 B2 * 2/2005 Murray ................. B65B 61/205 206/217
2003/0221393 A1 * 12/2003 Kothari ................. B65B 61/205 53/410
2004/0123883 A1 7/2004 Pritchard et al.
2005/0067430 A1 * 3/2005 Hiramoto .............. B31B 70/844 221/239

(Continued)

FOREIGN PATENT DOCUMENTS

EP 1043246 A1 * 10/2000 ............. B31B 19/90
JP 02072057 A * 3/1990 ....... B29C 66/53262

(Continued)

*Primary Examiner* — Stephen F. Gerrity

(74) *Attorney, Agent, or Firm* — Egbert, McDaniel & Swartz, PLLC

(57) ABSTRACT

An automatic machine includes: a central frame; a support rotatably connected to the central frame; handling mechanisms for moving the support; a plurality of carriages supported by the support; each carriage supports a bag vertically; a loading station; a spreading station downstream of the loading station; a filling station downstream of the spreading station; a first heat-sealing station downstream of the filling station; an insertion unit that loads a straw in the bag; a second heat-sealing station. The insertion unit is provided in the first heat-sealing station.

9 Claims, 9 Drawing Sheets

(56) References Cited

U.S. PATENT DOCUMENTS

| | | | | |
|---|---|---|---|---|
| 2012/0285122 | A1* | 11/2012 | Concetti | B65B 43/465<br>53/139.2 |
| 2016/0297553 | A1* | 10/2016 | Lopez | B65B 61/186 |
| 2017/0088362 | A1 | 3/2017 | Yoshikane | |
| 2018/0327129 | A1* | 11/2018 | Guru et al. | B65B 61/205 |

FOREIGN PATENT DOCUMENTS

| | | | | | |
|---|---|---|---|---|---|
| JP | 07187202 | A | * | 7/1995 | B29C 66/53263 |
| JP | H11333950 | A | * | 12/1999 | B31B 70/85 |
| JP | 2005059880 | A | * | 3/2005 | B65B 61/186 |
| WO | 99/41155 | A1 | | 8/1999 | |
| WO | WO-2009135747 | A1 | * | 11/2009 | B65B 43/465 |

* cited by examiner

MACHINE AND IMPROVED PACKAGING PROCESS OF A DISPOSABLE DISPENSER WITH INTEGRATED STRAW

CROSS-REFERENCE TO RELATED APPLICATIONS

Not applicable.

BACKGROUND OF THE INVENTION

1. Field of the Invention

The present invention relates to a machine and a packaging process of a disposable dispenser with integrated straw.

The field of reference is packaging, particularly that relating to the machines for the automatic packaging of products in a bag.

2. Description of Related Art Including Information Disclosed Under 37 CFR 1.97 and 37 CFR 1.98

Generally, products consisting of liquids, powders or wipes are packaged inside a package in the shape of a bag.

With reference to liquid products, it was devised to provide such bags with an integrated straw used by the user to use/consume the liquid contained in a bag.

More specifically, reference is made to bags containing beverages that can be consumed by means of said straw, which is attached to the bag by means of heat-sealing.

A first type of bags is known, in which a large straw is provided with a closure cap, and a second type of bags, in which the end of the straw on which the consumer's mouth is intended to rest is closed and protected by a portion of the bag intended to be removed when the user decides to drink the beverage in the bag.

Referring to FIG. 1A, a bag of the second type comprises:
- a compartment;
- an upper edge (B);
- a straw (13*a*) attached below said upper edge (B);
- a first heat-sealing (T1) at the straw (13*a*);
- a second heat-sealing (T2) near the upper edge (B), above the straw (13*a*).

A machine according to the prior art is illustrated in FIGS. 1 and 2, wherein: FIG. 1 is an axonometric view of a central frame of the machine supporting a support, to which carriages are attached, side by side; and FIG. 2 is a block diagram of the machine.

With reference to FIG. 1, the machine for making bags with integrated straw comprises:
- a central frame (T);
- a support (R) rotatably connected to the central frame (T), having a vertical axis of rotation;
- handling means to move the support (R) relative to the central frame (T);
- a plurality of carriages (C) supported by said support (R), side by side; each carriage (C) comprising at least two grippers (P) suitable for vertically supporting a bag (S), near an upper edge (B) of the bag (S).

With reference to FIG. 2, the machine has a carousel-like structure in which the support (R) rotates in the center with respect to a set of units, each one of them being positioned at an operating station of the machine. The carriages supported by the support (R) are moved step-by-step cyclically through all the stations.

FIG. 2 shows the main stations that are necessary to make a bag (S) with integrated straw (13) and the units located at the stations. The machine comprises:
- a loading station (S1), where a carriage (C) is temporarily stationed;
- a loading unit disposed at said loading station (S1); the loading unit is configured in such a way as to load a bag (S) onto the carriage, said bag (B) having a compartment and a mouth to provide access to the compartment at the upper edge (B);
- a spreading station (S2) downstream of the loading station (S1) and where a carriage (C) is temporarily stationed;
- a spreading unit located at the spreading station (S2); the spreading unit is configured in such a way as to spread out the bag supported by the carriage (C) stationed at the spreading station (S2); in most cases, means are also provided to control the actual opening of the bag;
- a filling station (S3) downstream of the spreading station (S2) and where a carriage (C) is temporarily stationed;
- a filling unit located at the filling station (S3); the filling unit is configured in such a way to fill the bag (S) supported by the carriage (C) stationed at the filling station (S3); the filling unit—which for graphic exemplification is not depicted in the figures—comprises a container suitable for containing a product to be introduced into the bag, and filling means suitable for taking the product from the container and introducing it into the compartment of the bag (S) that has been spread out;
- an insertion unit configured in such a way to insert the straw (13*a*) through the mouth that provides the access to said compartment of the bag (S), positioning it below the upper edge (B) of the bag (S);
- a first heat-sealing station (S5) downstream of the filling station (S3) and where a carriage (C) is temporarily stationed;
- a first heat-sealing unit, located at said first heat-sealing station (S5), downstream of said insertion unit (1); the first heat-sealing unit comprises two plates, conformed in such a way as to heat-seal the bag (S), performing a first heat-sealing (T1) of the bag (S) that closes the mouth that provides the access to the compartment of the bag (S), intercepting and blocking also the straw (13*a*);
- a second heat-sealing station (S51), downstream of said first heat-sealing station (S5) and where a wagon (C) is temporarily stationed;
- a second heat-sealing unit, located at the second heat-sealing station (S51); the second heat-sealing unit comprises two plates, conformed in such a way as to heat-seal the bag (S) at the upper edge (B), above the straw (13*a*), performing a second heat-sealing (T2).

Such a machine comprises the insertion unit, which loads the straw (13*a*) into the bag (S), which is supported by the grippers (P) of the carriage (C) intended to carry the bag (S) to the first heat-sealing station (S5).

The loading to be carried out by the insertion unit must take place before the plates of the first heat-sealing unit approach, in order to compress the mouth of the bag (S) at the straw (13*a*), so that the latter is heat-sealed to the bag in the correct position.

The procedure for making a disposable bag with integrated straw by means of such a machine comprises the following operational steps:
- operating the loading unit in order to load a bag (S) onto the grippers (P) of the carriage (C) stationed on the loading station (S1);

operating the handling means in order to move the support (R) moving the carriage (C) from the loading station (S1) to the spreading station (S2);
stopping the handling means;
spreading out the bag (S) by means of the spreading unit;
operating the handling means in order to move the support (R) moving the carriage (C) from the spreading station (S2) to the filling station (S3);
stopping the handling means;
taking the product from the container of the filling unit by means of the filling means;
filling the bag (S) with product by means of the filling means;
operating the handling means in order to move the support (R);
placing the straw (13*a*) in the bag (S) supported by the grippers of the carriage (C);
placing the bag (S) with straw between the plates of the first heat-sealing unit (5);
operating the two plates of the first heat-sealing unit by performing the first heat-sealing (T1) of the bag (S);
operating the handling means in order to move the support (R) placing the carriage (C) in the second heat-sealing station (S51);
stopping the handling means;
performing the second heat-sealing (T2) of the bag (S) by means of the second heat-sealing unit.

The straw (13*a*) used in this type of bags has two portions: an inner portion, extending from the first heat-sealing (T1) toward the compartment of the bag (S), and an outer portion, extending from the first heat-sealing (T1) toward the outside of the compartment of the bag (S).

The inner portion is designed to be as short as possible in order not to take away space from the compartment, whereas the outer portion has a length that, on the one hand, should allow the user to rest his or her lips on the straw preventing them from coming into contact with the bag, and on the other hand, should not compromise the final size of the bag (S).

A bag provided with a straw dispenses the product in a better way, compared to a bag without a straw. For these reasons, it is necessary for the insertion unit to be as accurate as possible in grasping the straw (13*a*) and placing it inside the bag (S) in the chosen arrangement.

If the insertion unit were to position the straw (13*a*) too high, there would be a risk that the straw (13*a*) would not be attached properly by the first heat-sealing (T1) and/or that the second heat-seal (T2) would intercept said straw (13*a*). Conversely, if the insertion unit were to position the straw (13*a*) too low, there would be a risk of making a bag (S) with such a short outer portion of the straw (13*a*) that the user would have to drink by resting his or her lips on the straw (13*a*), but also on the bag (S).

The major drawbacks of the insertion units of the prior art are related to their conformation and/or position, which complicate and make the procedure cumbersome during the process of loading the straw (13*a*) and attaching it by means of the first heat-sealing (T1).

It is precisely the malfunctions of the insertion unit that are the most frequent cause of a machine downtime. The speed of the forward movement of the support (R), and consequently the production speed of the machine, depend on the timing of said insertion unit.

The timing of all the other stations are shorter than those required by the insertion unit, since the latter must cyclically take the straw from a magazine, transport it above the mouth of the bag (S) and insert it into the bag (S) in the correct position before the plates perform the first heat-sealing (T1).

US2017/088362A1 describes a machine according to the preamble of claim 1.

WO99/41155A1 discloses a container, method and device for making a container as well as a method and device for filling a container.

US2004/123883A1 discloses an apparatus for attaching a tube segment to a bag by fusing them together in an aseptic form, fill and seal operation.

BRIEF SUMMARY OF THE INVENTION

The purpose of the present invention is to devise a machine for making bags with integrated straw comprising an improved insertion unit that is not impaired by the drawbacks of the prior art.

Another purpose is to provide such a machine for making a bag with embedded straw that is fast, reliable and allows for a high production speed.

These purposes are achieved in accordance with the invention with the features listed in the attached independent claim 1.

Advantageous achievements appear from the dependent claims.

The machine according to the invention is defined by claim 1.

BRIEF DESCRIPTION OF THE SEVERAL VIEWS OF THE DRAWINGS

For explanatory clarity, the description of the machine according to the invention continues with reference to the attached drawings, which are for illustrative and non-limiting purposes only, wherein.

DETAILED DESCRIPTION OF THE INVENTION

Figure 1:
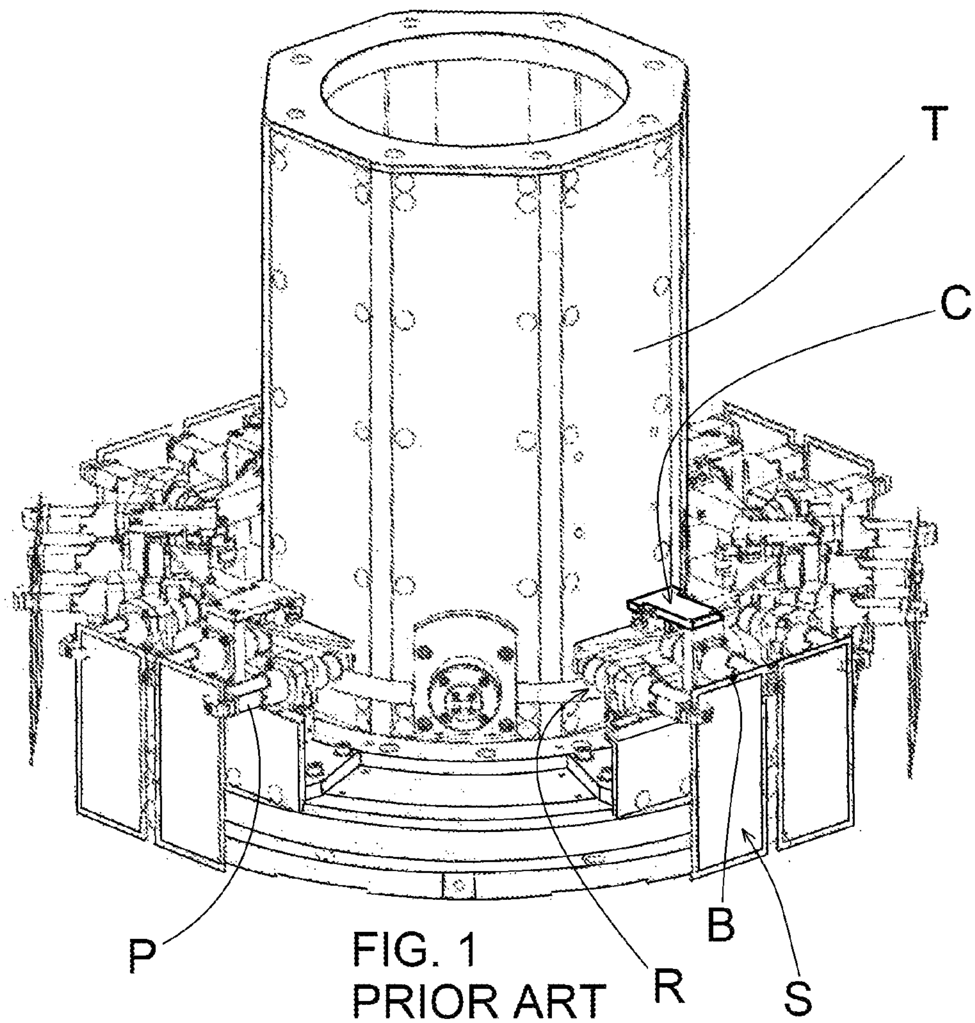
FIG. 1 PRIOR ART
FIG. 1 is an axonometric view of a central frame of a machine according to the prior art, which supports a support, to which carriages are attached, side by side.
Figure 1A:
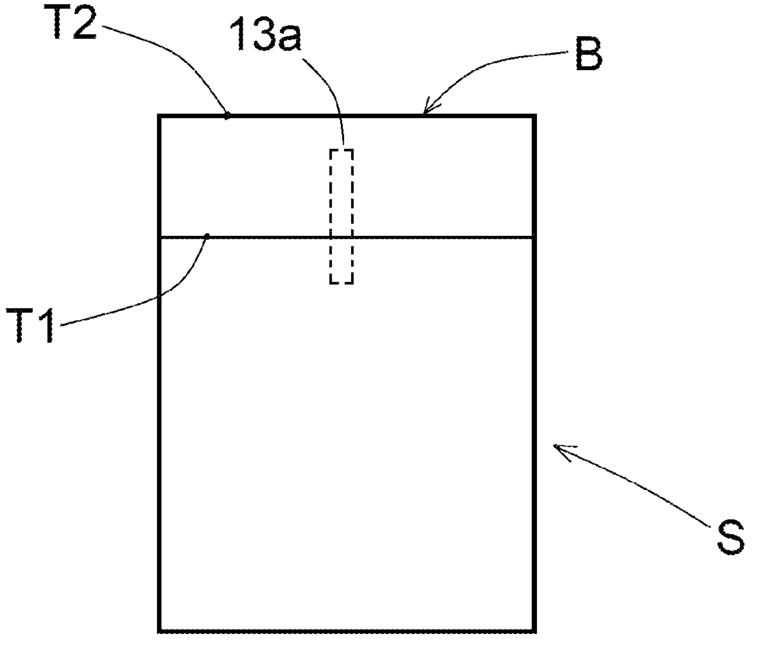
FIG. 1A shows is a diagrammatic view of a bag with embedded straw.
Figure 2:
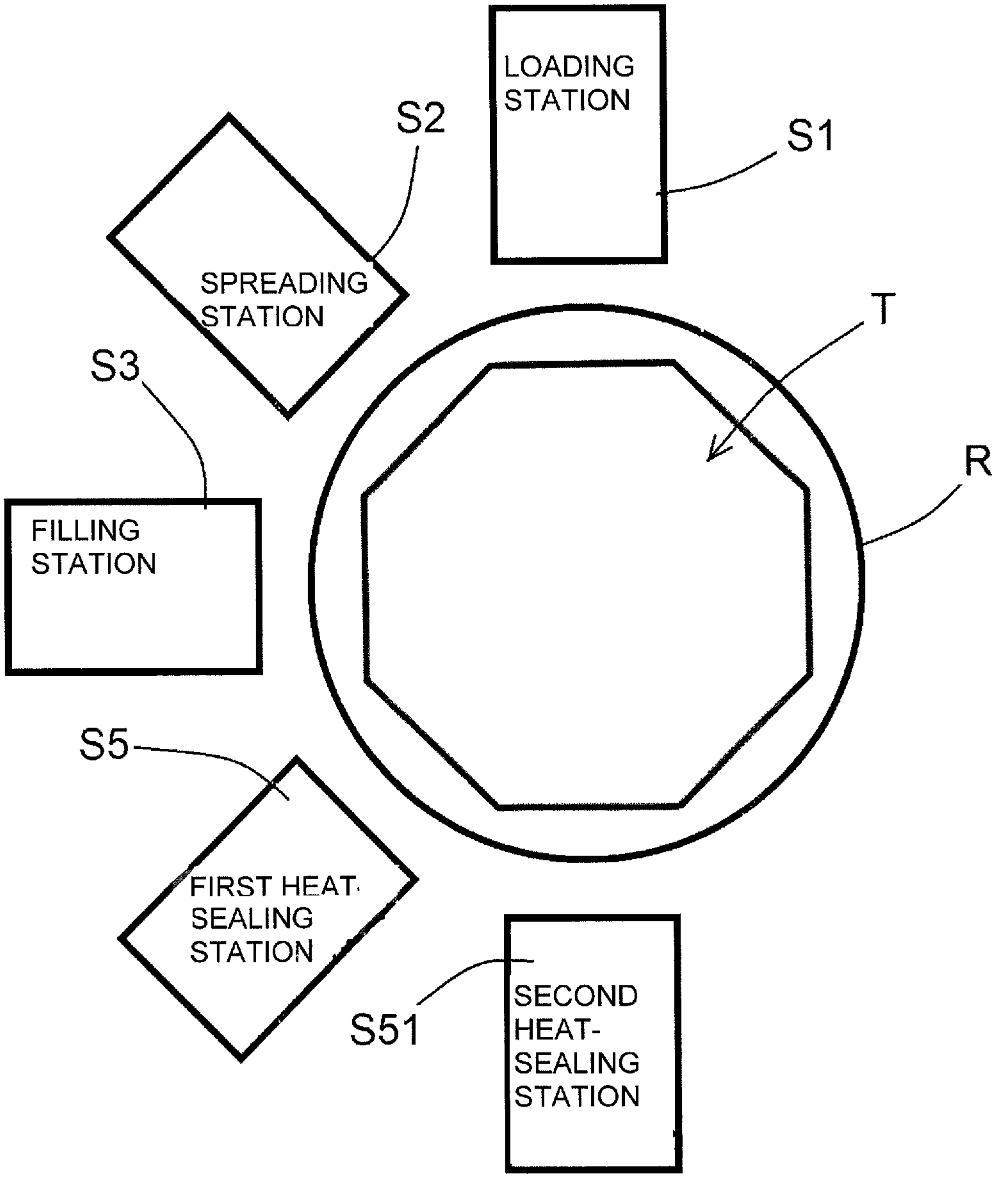
FIG. 2 PRIOR ART
FIG. 2 is a block diagram of a machine according to the prior art.

Hereafter, elements that are equal or corresponding to those already described are shown with the same reference numerals, omitting their detailed description.

With reference to FIGS. 3 to 9, the machine according to the invention is described, it being comprehensively indicated by the reference numeral 100.

The machine (100) comprises the support (R) rotatably mounted in the central frame (T) and the carriages (C) with the grippers (P) mounted on the support (R). The machine (100) comprises the loading station (S1), the spreading station (S2), the filling station (S3), the first heat-sealing station (S5), and the second heat-sealing station (S51).

The insertion unit (1) is located at the first heat-sealing station (S5). The insertion unit (1) loads the straw (13*a*) into the bag (S), which is supported by the grippers (P) of the carriage (C) stationed at the first heat-sealing station (S5).

Figure 3:
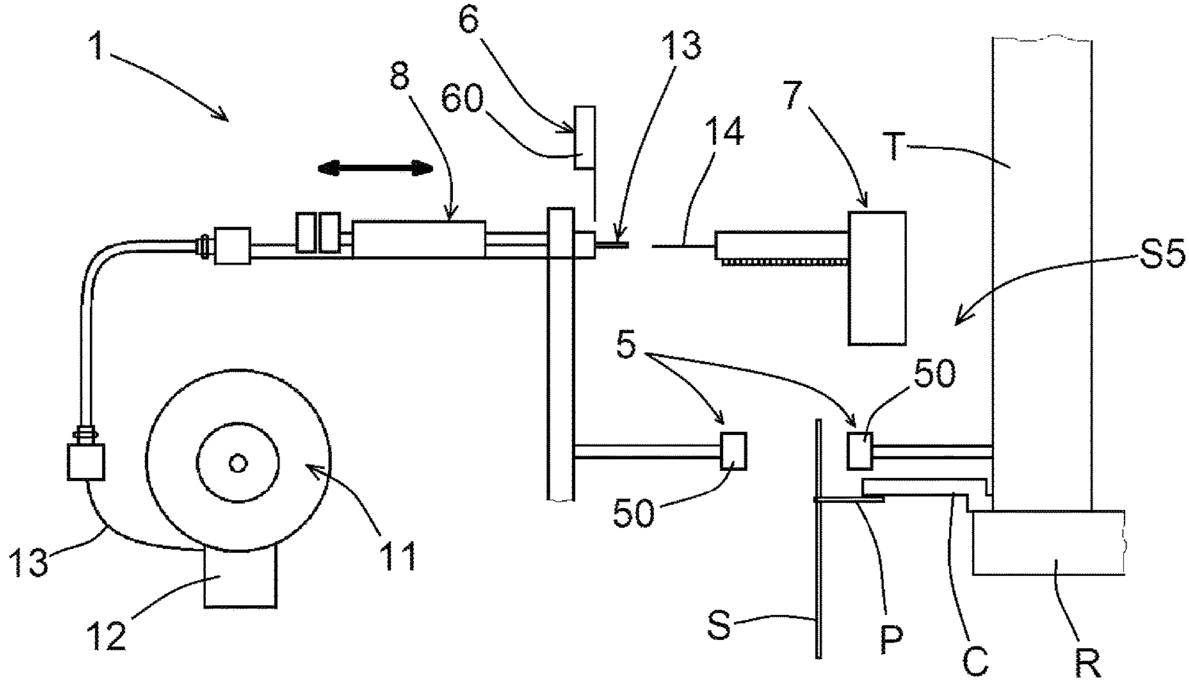
FIG. 3 is a diagrammatic side view of an insertion unit of the machine according to the invention.
Figure 3A:
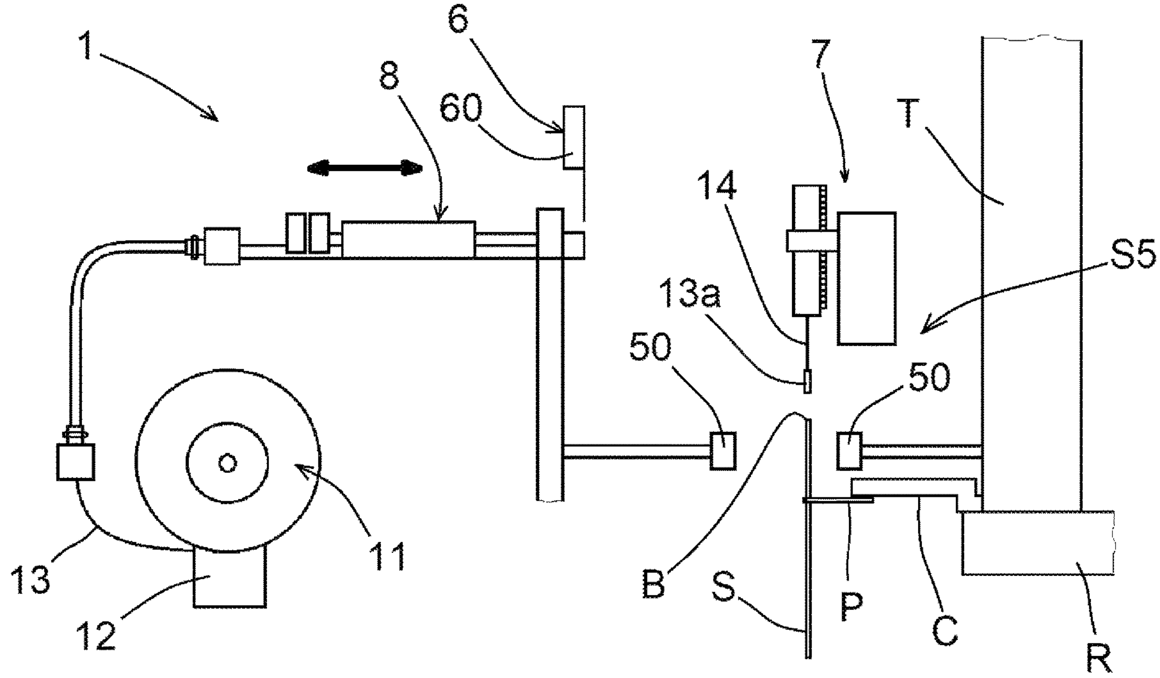
FIG. 3A is the same as FIG. 3, but with a tip of the insertion unit rotated by 90°.

With special reference to FIGS. 3 and 3A, the insertion unit (1) comprises:

- a reel (11);
- support means (12) conformed in such a way as to rotatably support said reel (11);
- a tubular filiform element (13) wound on said reel (11);
- cutting means (6) for cutting said tubular filiform element (13) to a preset length in order to make a straw (13*a*); and
- handling means (7) to move the straw (13*a*).

The handling means (7) of said insertion unit (1) are conformed in order to take the straw (13*a*) in the vicinity of the cutting means (6) and place it inside the bag (S) below the upper edge (B) of the bag supported by the grippers (P) of the carriage (C) stationed in the first heat-sealing station (S5).

Figure 6:
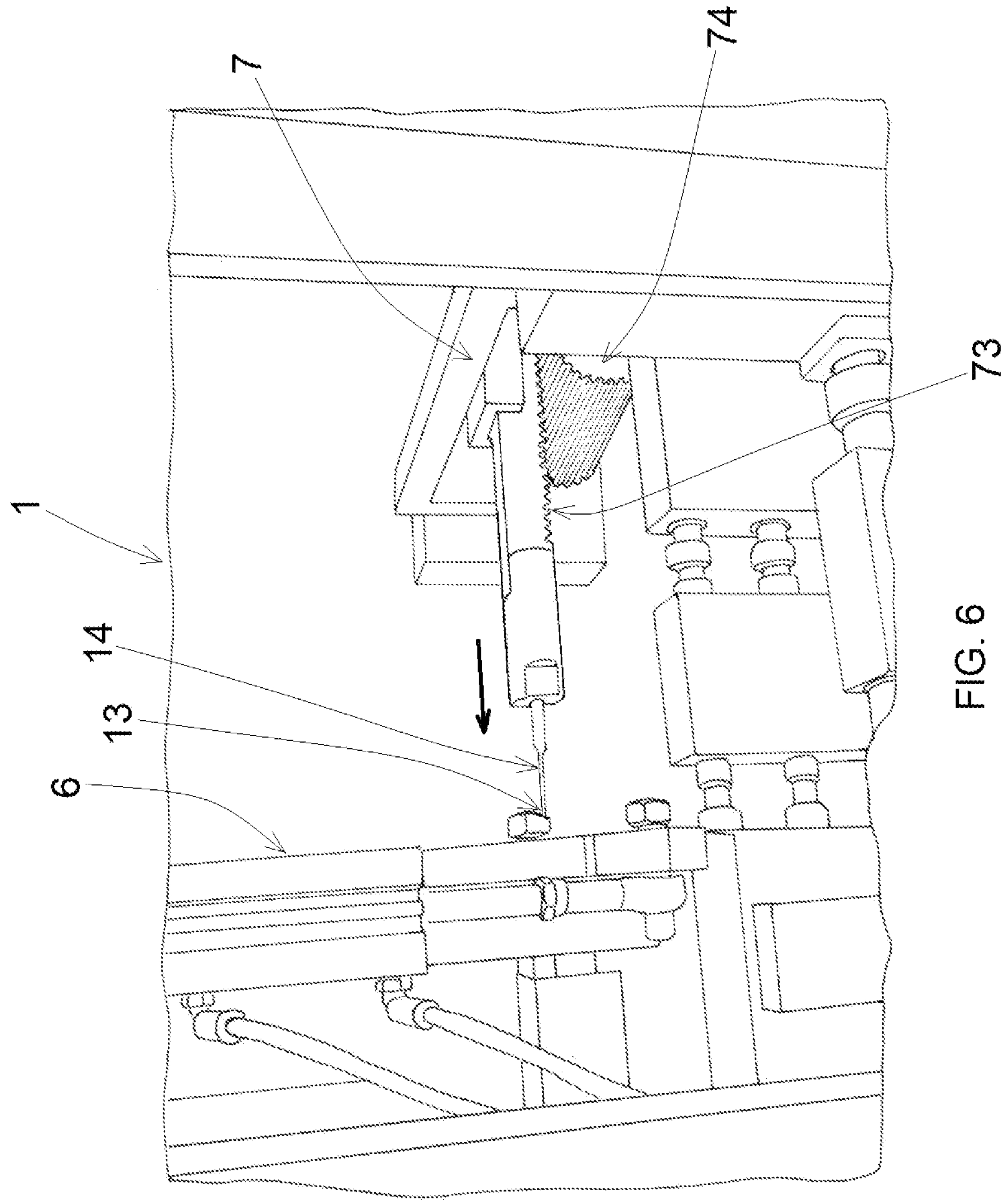
Figure 7:
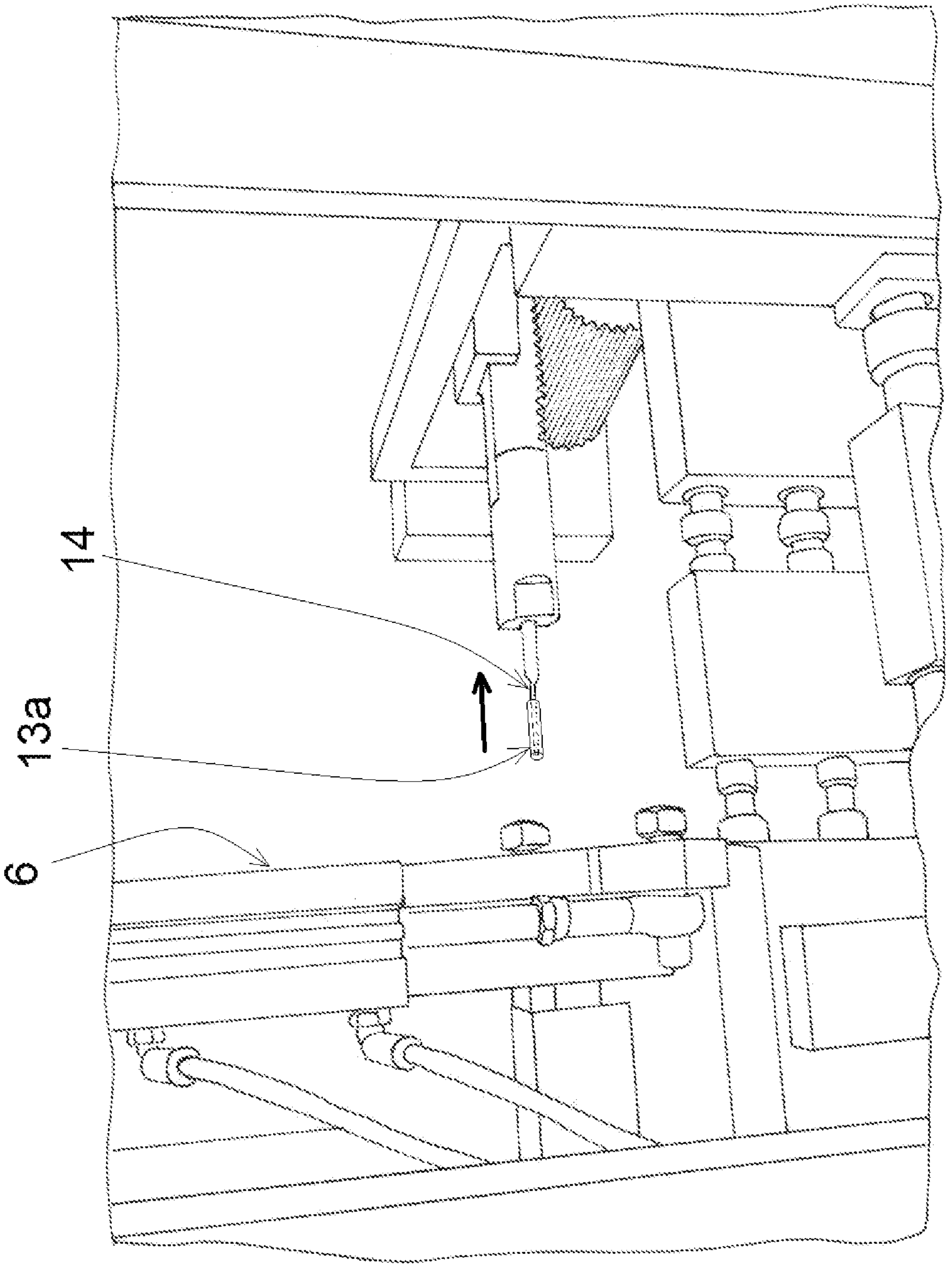

With special reference to FIGS. 6 and 7, the insertion unit (1) comprises a tip (14) conformed so that it can be inserted with interference into the straw (13*a*).

Figure 5:
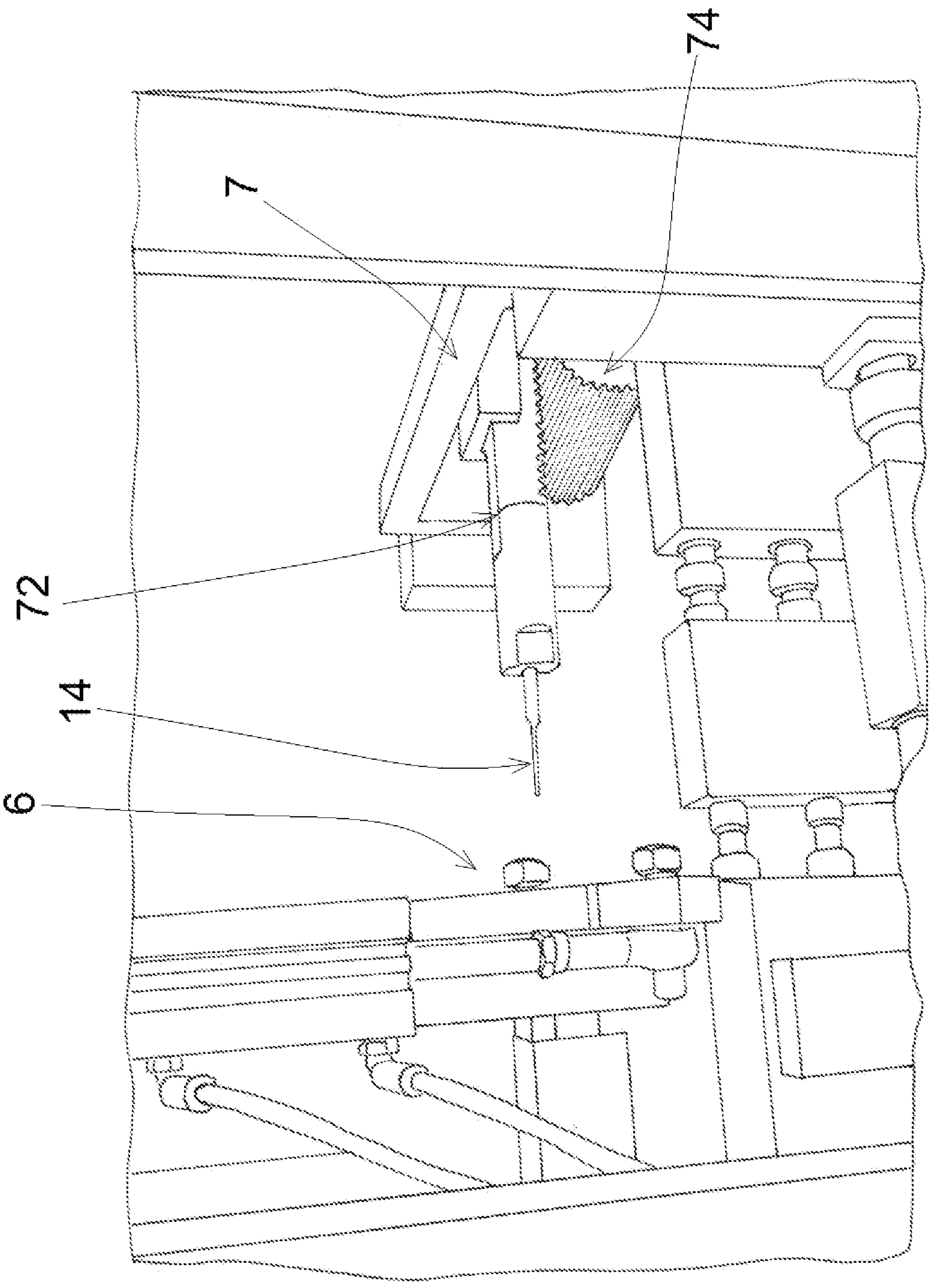
FIGS. 5 to 9 are axonometric views of the handling means of the tip in cyclical positions.
Figure 8:
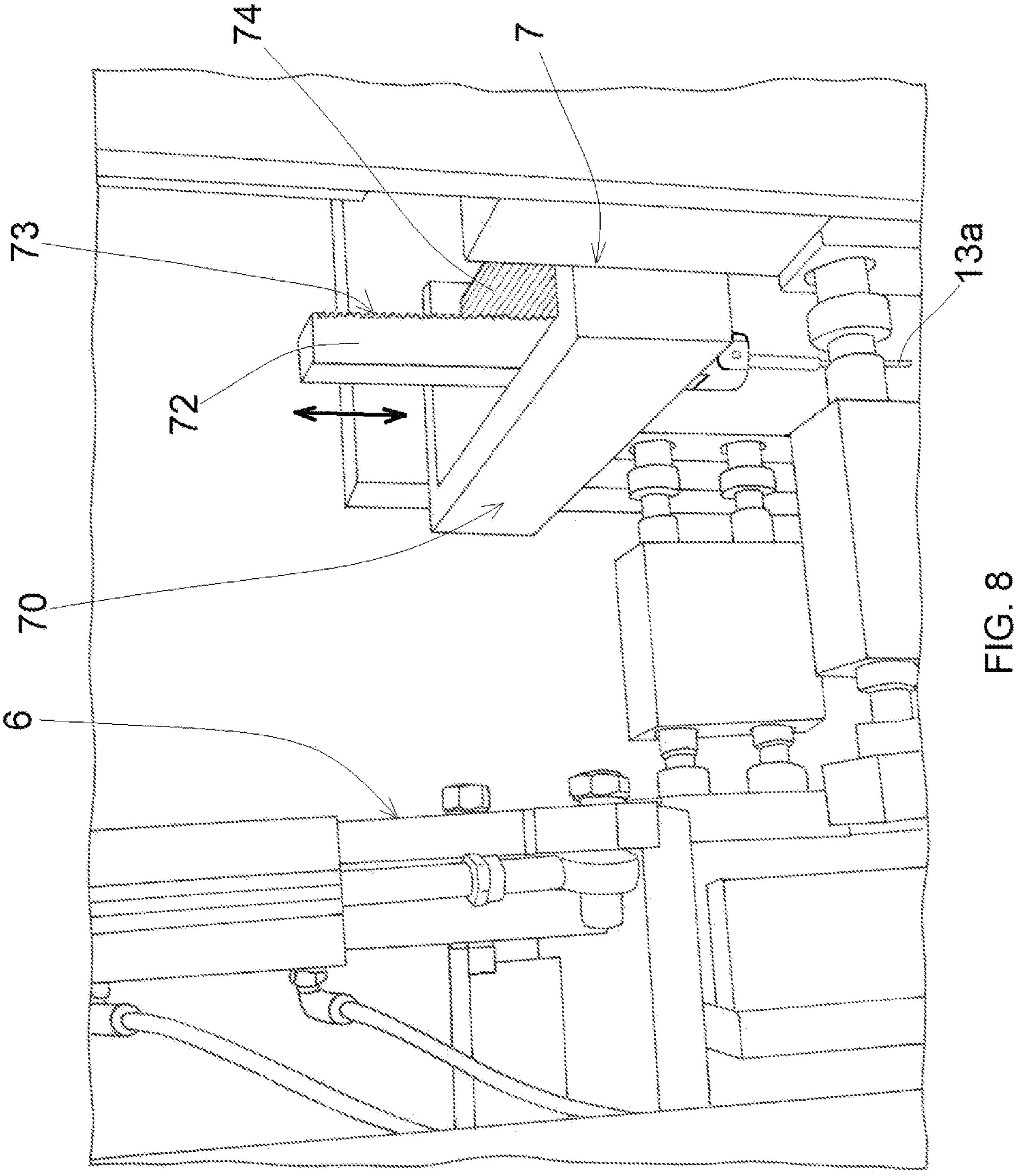
Figure 9:
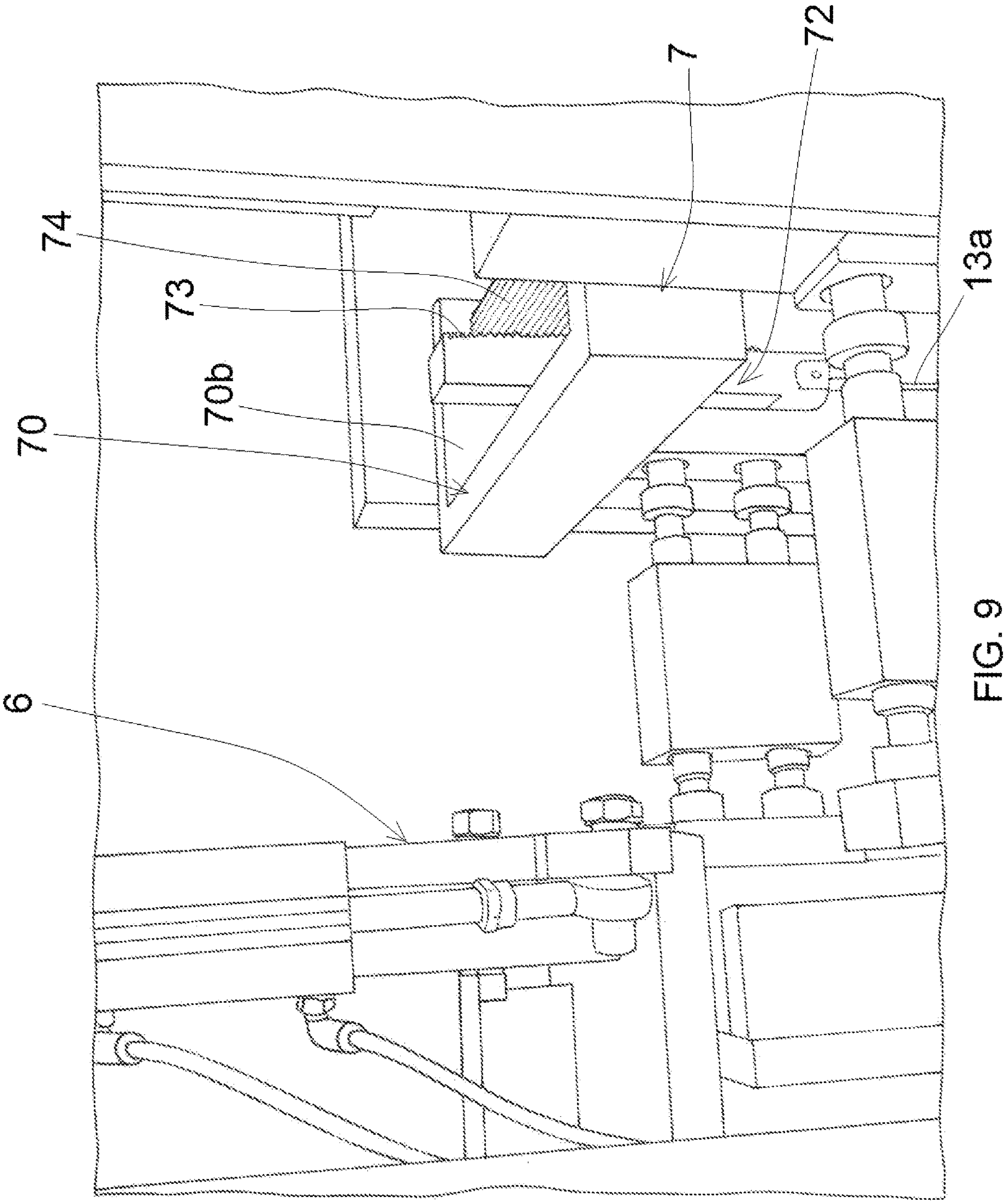

Referring to FIGS. 5 to 9, the handling means (7) of the insertion unit (1) are disposed above said grippers (P) of the carriage (C) and allow the tip (14) to be cyclically disposed in four positions:

- a first position, wherein the tip (14) is retracted, aligned with the tubular filiform element (13), at the cutting means (6), and is not inserted into the tubular filiform element (13), as shown in FIG. 5;
- a second position, wherein the tip (14) is extracted, inserted into the tubular filiform event (13), which is successively cut by the cutting means (6) to obtain the straw (13*a*) on the tip (14), as shown in FIG. 6;
- a third position, wherein the tip (14) with the straw (13*a*) has been rotated by 90°, it being disposed vertically above the carriage (C), which is temporarily stationed at the first heat-sealing station (S5), as shown in FIG. 8; and
- a fourth position, wherein the tip (14) has been moved forward, descending downward and placing the straw (13*a*) inside the bag (S) and below the upper edge of the bag supported by the carriage (C) that is provisionally stationed in the first heat-sealing station (S5), as shown in FIG. 9.

Figure 4:
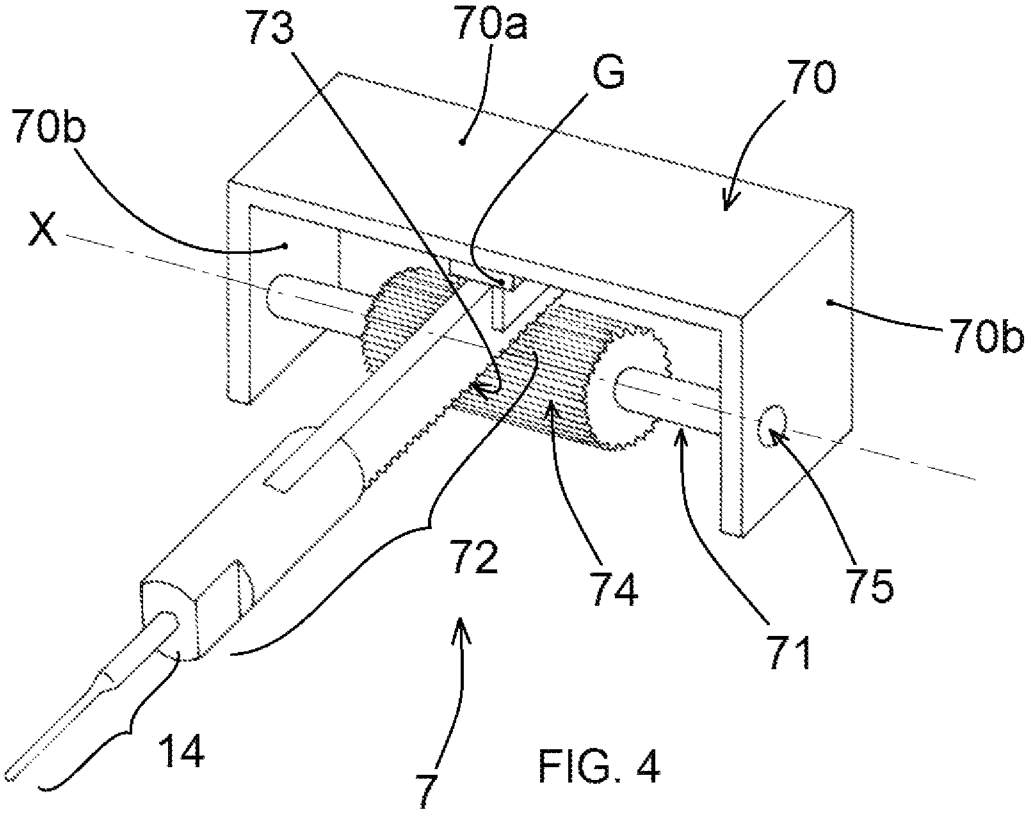
FIG. 4 is an axonometric view of handling means of the tip of the insertion unit of the machine according to the invention.

With particular reference to FIG. 4, the handling means (7) of the insertion unit (1) comprise a linear actuator (A) supported by a frame (70) rotatably mounted in the central frame (T) so as to rotate about a horizontal axis (X).

The tip (14) is connected to the linear actuator (A). In such a way, the tip (14) is moved from a retracted position to an extracted position.

The frame (70) is connected to a second actuator (not shown in the figures) to rotate from a first position, wherein the tip (14) is horizontally facing the cutting means (6), to a second position wherein the tip (14) is vertically facing the bag (S) supported by the grippers (P) of the carriage (C).

The frame (70) is in the form of a U-shaped bracket comprising a horizontal portion (70*a*) and two side portions (70*b*) pivoted to the central frame (T) by means of pivoting means (75).

The linear actuator (A) comprises a stem (72) having a rack (73) that meshes into a gearwheel (74). The tip (14) is connected to the stem (72).

A guide (G) is mounted in the horizontal portion (70) of the frame to guide the stem (72). The gearwheel (74) is mounted on a shaft (71) pivoted to the two lateral portions (70*b*) of the frame. An electric motor (not shown) drives the gearwheel (74) in rotation. The axis of rotation (X) of the pivoting means (75) coincides with the axis of the gearwheel (74).

With reference to FIGS. 3 and 3A, said insertion unit (1) comprises step-by-step feeding means (8), which move the tubular filiform element (13) by a preset pitch, so as to position it below the cutting means (6) and insert it onto the tip (14), when the tip (14) is in its second position.

Again with reference to FIGS. 3 and 3A, the cutting means (6) comprise a guillotine (60) and an actuator. The actuator moves the guillotine (60) in order to cut the tubular filiform element (13) and obtain said straw (13*a*).

The first heat-sealing unit (5) comprises two plates (50) connected to said central frame (T) and disposed in the vicinity of said at least two grippers (P). Said two plates (50) comprise a heat-sealing surface configured in such a way to perform the first heat-sealing to the bag (S).

Advantageously, the heat-sealing surface comprises a seat for the straw (13*a*). In fact, the straw (13*a*) is positioned by the tip (14), which is moved by the handling means (7) of the insertion unit (1), into the bag at the seat of the heat-sealing surface. The plates (50) of the first heat-sealing unit (5) perform a heat-sealing near the upper edge (B) of the bag, around the straw in order to block it.

Although not visible in the attached figures, the machine (100) according to the invention may comprise one or more control stations, interposed between the stations described above. Such control stations may perform a control after an operational step performed at a previous station or a simple control of the bag that may occur before the carriage rotates, transporting the bag to the next station.

A packaging process of a bag with a straw, performed with the machine (100) according to the invention, is described below.

The process comprises the following steps:

- unwinding the tubular filiform element (13) from the reel (11);
- cutting the tubular filiform element (13) by means of said cutting means (6) to obtain a straw (13*a*); and
- tacking the straw (13*a*) near the cutting means (6) by means of the handling means (7) of the insertion unit (1).

With particular reference to FIGS. 5 to 9, the cycle performed by the handling means (7) of the insertion unit (1) to take the straw (13*a*) in the vicinity of the cutting means (6) and place it in the bag (S) supported by the grippers (P) of the carriage (C) comprises the following steps:

- positioning of the tip (14) aligned with the tubular filiform element (13) in the vicinity of the cutting means (6), with the stem (72) in retracted position and not inserted into the tubular filiform element (13);
- actuation of the linear actuator (A) in order to move the tip (14) toward the cutting means (6);
- insertion of the tubular filiform element (13) onto the tip (14) by means of the step-by-step feeding means (8);
- operation of the cutting means (6) to cut the tubular filiform element (13) in order to obtain the straw (13*a*);
- operation of the linear actuator (A) in order to retract the tip (14) relative to the cutting means (6);
- rotation of the frame (70) of the handling means in order to rotate the tip (14) with the straw (13*a*) by 90°, which are arranged vertically above the bag (S) supported by the grippers (P) of the carriage (C) temporarily stationed in the first heat-sealing station (S5);
- actuation of the linear actuator (A) in order to move the tip (14) toward the bag (S), inserting the straw (13*a*) into the bag (S), and heat-sealing of the bag (S) by means of the two plates (50) of the first heat-sealing unit (S5).

The advantages of the machine according to the invention appear obvious, which allows for overcoming the drawbacks of the machines of the prior art, speeding up the step of taking the straw, inserting it into the bag, and heat-sealing the upper edge of the bag.

An additional advantage of the present invention consists in providing the insertion unit (1) of the machine according to the invention in the first heat-sealing station (S5) in such a way that the heat-sealing is performed immediately after the straw (13*a*) is inserted into the bag, thus overcoming all the drawbacks described in the prior art.

Numerous variations and modifications of detail may be made to the embodiment of the invention, within the reach of a person skilled in the art, and still within the scope of the invention as expressed by the appended claims.

I claim:

1. Automatic machine for packaging a disposable bag with integrated straw; said machine comprising:

a central frame;

a support rotatably connected to said central frame;

a plurality of carriages supported by said support, each carriage comprising at least two grippers suitable for vertically supporting a bag with an open mouth;

a loading unit disposed at a loading station to load a bag on the carriage;

a spreading unit disposed at a spreading station to spread out the bag supported by the carriage;

a filling unit disposed at a filling station, to fill the bag supported by the carriage with a product to be introduced in the bag;

a first heat-sealing unit disposed at a first heat-sealing station to make a first heat-sealing of the bag, closing a mouth of the bag; and a second heat-sealing unit disposed at a second heat-sealing station to make a second heat-sealing of the bag at an upper edge of the bag;

an insertion unit disposed at said first-heat sealing station and configured to load a straw into the bag that is supported by the grippers of the carriage;

said insertion unit comprising:

a tubular filiform element wound on a reel;

cutting means for cutting said tubular filiform element in order to obtain a straw;

a tip configured in such a way as to be inserted into the straw with interference to pick the straw;

handling means to move the tip in such a way as to pick said straw near the cutting means and position said straw inside the bag, under an upper edge of the bag supported by the grippers of the carriage that is stationed in the first heat-sealing station;

wherein said handling means are configured to cyclically dispose the tip cyclically in four positions:

a first position wherein the tip is at the cutting means in a retracted position and is not inserted in the tubular filiform element;

a second position wherein the tip is moved forward and is disposed at the cutting means, so as to be inserted into the tubular filiform element that will be cut by the cutting means to obtain the straw on the tip;

a third position wherein the tip is rotated in order to transport the straw that is disposed vertically and above the bag supported by the carriage which is temporarily stationed in the first heat-sealing station; and a fourth position wherein the tip is moved forward, descending downwards and positioning the straw inside the bag supported by the carriage that is temporarily stationed in the first heat-sealing station.

2. The machine of claim 1, wherein said handling means comprise a linear actuator supported by a frame that is rotatably mounted in the central frame in such a way to rotate around a horizontal axis, the tip being connected to the linear actuator.

3. The machine of claim 2, wherein said linear actuator comprises a stem having a rack that meshes into a gear wheel, and the tip is connected to the stem of the linear actuator.

4. The machine of claim 2, wherein said frame of the handling means is in the form of a U-shaped bracket comprising a horizontal portion and two side portions pivoted to the central frame by means of pivoting means.

5. The machine of claim 4, wherein the gearwheel is mounted on a shaft pivoted to the two lateral portions of the frame and said handling means comprise a guide mounted in the horizontal portion of the frame to guide the stem.

6. The machine of claim 1, wherein said insertion unit comprises step-by-step feeding means that move the tubular filiform element by a preset pitch, so as to position it under the cutting means and insert it onto the tip, when the tip is in its second position.

7. The machine of claim 1, wherein said cutting means comprise a guillotine and an actuator, said actuator moving said guillotine in order to cut the tubular filiform element to obtain said straw.

8. The machine of claim 1, wherein said first heat-sealing unit comprises two plates connected to said central frame and disposed at said at least two grippers of the carriage, said two plates comprising a heat-sealing surface configured for the purpose of performing said first heat-sealing, said heat-sealing surface comprising a seat for the straw to be hermetically heat-sealed by means of said first heat-sealing.

9. Packaging process of a bag with a straw by means of a machine of claim 1, comprising the following steps:

loading a bag onto a carriage;

spreading out the bag supported by the carriage;

filling the bag supported by the carriage with a product;

unwinding a tubular filiform element from the reel and feed it to the cutting means;

positioning the tip in a first position at the cutting means, in retracted position and not inserted into the tubular filiform element;

positioning the tip in a second position in which it moves forward and is disposed at the cutting means, in such a way to be inserted into the tubular filiform element;

cutting the tubular filiform element with the cutting means to obtain a straw;

positioning the tip in a third position in which it rotates in order to transport the straw that is arranged vertically and above the bag supported by the carriage that is temporarily stationed in the first heat-sealing station;

positioning the tip in a fourth position in which it moves forward, descending downward and positioning the straw inside the bag supported by the carriage that is temporarily stationed in the first heat-sealing station;

first heat-sealing of the bag to close the opening mouth of the bag; and second heat-sealing at an upper edge of the bag above the straw.

* * * * *